United States Patent
Deurwaarder et al.

(10) Patent No.: US 10,502,641 B2
(45) Date of Patent: Dec. 10, 2019

(54) FLOATING CONDUCTOR HOUSING

(71) Applicant: Sensata Technlogies, Inc., Attleboro, MA (US)

(72) Inventors: Vincent Deurwaarder, Wemeldinge (NL); Christiaan Baerts, Paal-Beringen (BE); Nikolay Chebishev, Sofia (BG)

(73) Assignee: Sensata Technologies, Inc., Attleboro, MA (US)

( * ) Notice: Subject to any disclaimer, the term of this patent is extended or adjusted under 35 U.S.C. 154(b) by 121 days.

(21) Appl. No.: 15/599,167

(22) Filed: May 18, 2017

(65) Prior Publication Data

US 2018/0335351 A1 Nov. 22, 2018

(51) Int. Cl.
*G01K 13/02* (2006.01)
*G01K 1/08* (2006.01)

(52) U.S. Cl.
CPC ............. *G01K 13/02* (2013.01); *G01K 1/08* (2013.01); *G01K 2013/024* (2013.01)

(58) Field of Classification Search
CPC ........... G01K 13/02; G01K 1/08; G01K 1/12; G01K 1/146; G01K 2013/024
See application file for complete search history.

(56) References Cited

U.S. PATENT DOCUMENTS

| | | | |
|---|---|---|---|
| 2,892,879 A * | 6/1959 | Fritts | G01K 1/08 136/228 |
| 3,691,842 A | 9/1972 | Akeley | |
| 3,832,668 A * | 8/1974 | Berman | H01C 7/04 29/612 |
| 4,080,027 A | 3/1978 | Benasutti | |
| 4,131,088 A | 12/1978 | Reddy | |

(Continued)

FOREIGN PATENT DOCUMENTS

CN 103454032 A 12/2013
CN 106482858 A 3/2017

(Continued)

OTHER PUBLICATIONS

Search Report from related Great Britain Application No. GB1807864.2 dated Nov. 13, 2018, 6 pages.

*Primary Examiner* — Lisa M Caputo
*Assistant Examiner* — Philip L Cotey
(74) *Attorney, Agent, or Firm* — Burns & Levinson, LLP; Joseph M. Maraia; Pegah Karimi

(57) ABSTRACT

A sensor assembly comprising a sensing element with at least one electrical lead extending therefrom. A tube encloses the sensing element and material surrounds the at least one electrical lead and defines a space around the at least one electrical lead so that when temperature gradients create push and pull, the at least one electrical lead moves within the space. The sensor assembly may further comprise a sleeve connected to the tube and surrounding the material. The sleeve may have an intermediate bent portion that the at least one electrical lead passes through, with a braided supply line connected to the leads, the braided supply line being arranged and configured within the bent portion to absorb movement of the two leads from temperature gradients. The lead can also extend through the sleeve forming a sinusoidal shape within the sleeve for absorbing movement resulting from temperature gradients.

17 Claims, 5 Drawing Sheets

(56) References Cited

U.S. PATENT DOCUMENTS

| | | | |
|---|---|---|---|
| 4,274,125 A | 6/1981 | Vogel | |
| 4,347,745 A | 9/1982 | Singh | |
| 4,716,492 A | 12/1987 | Charboneau et al. | |
| 4,875,135 A | 10/1989 | Bishop et al. | |
| 4,934,831 A * | 6/1990 | Volbrecht | G01K 1/08 29/612 |
| 4,955,380 A | 9/1990 | Edell | |
| 4,984,461 A | 1/1991 | Haynes | |
| 5,000,048 A | 3/1991 | Kordts | |
| 5,189,591 A | 2/1993 | Bernot | |
| 5,193,912 A | 3/1993 | Saunders | |
| 5,231,301 A | 7/1993 | Peterson et al. | |
| 5,259,248 A | 11/1993 | Ugai et al. | |
| 5,308,249 A | 5/1994 | Renn et al. | |
| 5,309,133 A * | 5/1994 | Berger | G01K 7/183 338/22 R |
| 5,388,997 A | 2/1995 | Grange et al. | |
| 5,388,998 A | 2/1995 | Grange et al. | |
| 5,427,553 A | 6/1995 | Tsuji | |
| 5,443,394 A | 8/1995 | Billman et al. | |
| 5,625,151 A | 4/1997 | Yamaguchi | |
| 5,676,559 A | 10/1997 | Laub et al. | |
| 5,800,186 A | 9/1998 | Ramirez et al. | |
| 5,831,512 A | 11/1998 | Wienand et al. | |
| 5,974,893 A | 11/1999 | Balcarek et al. | |
| 6,003,379 A | 12/1999 | Ichikawa et al. | |
| 6,050,862 A | 4/2000 | Ishii | |
| 6,182,644 B1 | 2/2001 | Kotwicki et al. | |
| 6,313,523 B1 | 11/2001 | Morris et al. | |
| 6,341,962 B1 | 1/2002 | Sinclair | |
| 6,353,381 B1 | 3/2002 | Dietmann et al. | |
| 6,363,922 B1 | 4/2002 | Romzek et al. | |
| 6,412,977 B1 | 7/2002 | Black et al. | |
| 6,418,793 B1 | 7/2002 | Pechoux et al. | |
| 6,473,711 B1 | 10/2002 | Sittler et al. | |
| 6,617,956 B1 | 9/2003 | Zitzmann | |
| 6,625,029 B2 | 9/2003 | Bernini | |
| 6,639,505 B2 | 10/2003 | Murata et al. | |
| 6,666,691 B2 | 12/2003 | Ikeya | |
| 6,701,790 B2 | 3/2004 | Fortner et al. | |
| 6,746,150 B2 | 6/2004 | Wienand et al. | |
| 6,776,668 B1 | 8/2004 | Scyoc et al. | |
| 6,790,065 B2 | 9/2004 | Fukunaga | |
| 6,829,820 B2 | 12/2004 | Adachi et al. | |
| 6,848,928 B2 | 2/2005 | Ikeya et al. | |
| 6,952,042 B2 | 10/2005 | Stratton et al. | |
| 7,000,478 B1 | 2/2006 | Zwollo et al. | |
| 7,073,375 B2 | 7/2006 | Parker et al. | |
| 7,077,008 B2 | 7/2006 | Pham et al. | |
| 7,197,936 B2 | 4/2007 | Baba | |
| 7,270,011 B2 | 9/2007 | Vossenberg | |
| 7,288,005 B2 | 10/2007 | Nagahashi | |
| 7,316,164 B2 | 1/2008 | Toyoda et al. | |
| 7,434,470 B2 | 10/2008 | Engelhardt et al. | |
| 7,464,604 B2 | 12/2008 | Takeuchi et al. | |
| 7,467,891 B2 | 12/2008 | Gennissen et al. | |
| 7,507,024 B2 | 3/2009 | Takahashi | |
| 7,513,806 B2 | 4/2009 | Noda et al. | |
| 7,568,835 B2 | 8/2009 | Pils et al. | |
| 7,578,194 B1 | 8/2009 | Hadjiloucas et al. | |
| 7,591,186 B1 | 9/2009 | Boyer | |
| 7,597,668 B2 | 10/2009 | Yarden | |
| 7,628,078 B2 | 12/2009 | Matsui et al. | |
| 7,651,366 B2 | 1/2010 | Ringler et al. | |
| 7,666,000 B1 | 2/2010 | Hsiao et al. | |
| 7,666,016 B2 | 2/2010 | Kobayashi | |
| 7,695,285 B2 | 4/2010 | Sugiura et al. | |
| 7,743,662 B2 | 6/2010 | Kurtz | |
| 7,762,140 B2 | 7/2010 | Girroir et al. | |
| 7,855,632 B1 | 12/2010 | Schuh et al. | |
| 7,887,355 B2 | 2/2011 | Watanabe | |
| 7,938,783 B2 | 5/2011 | Fraden | |
| 7,946,855 B2 | 5/2011 | Osato | |
| 7,976,326 B2 | 7/2011 | Stoner | |
| 7,992,445 B2 | 8/2011 | Kobayashi et al. | |
| 8,038,345 B2 | 10/2011 | Stoll et al. | |
| 8,069,729 B2 | 12/2011 | Dannhauer et al. | |
| 8,109,250 B2 | 2/2012 | Ramond et al. | |
| 8,132,464 B2 | 3/2012 | Broden et al. | |
| 8,161,820 B2 | 4/2012 | Yoneda et al. | |
| 8,171,800 B1 | 5/2012 | Chiou | |
| 8,192,078 B2 | 6/2012 | Gebauer et al. | |
| 8,215,176 B2 | 7/2012 | Ding et al. | |
| 8,234,927 B2 | 8/2012 | Schulte et al. | |
| 8,262,287 B2 * | 9/2012 | Darabnia | C23C 16/46 374/179 |
| 8,263,879 B2 | 9/2012 | Hougham et al. | |
| 8,328,419 B2 | 12/2012 | Wienand et al. | |
| 8,333,506 B2 | 12/2012 | Kamenov et al. | |
| 8,373,430 B1 | 2/2013 | Sochor | |
| 8,385,080 B2 | 2/2013 | Kim et al. | |
| 8,388,365 B2 | 3/2013 | Takahashi et al. | |
| 8,474,322 B1 | 7/2013 | Shapiro | |
| 8,505,386 B2 | 8/2013 | Colombo et al. | |
| 8,523,432 B2 | 9/2013 | Mujumdar et al. | |
| 8,535,079 B2 | 9/2013 | Wang et al. | |
| 8,545,097 B2 * | 10/2013 | Bachmann | F01D 21/003 374/163 |
| 8,545,240 B2 | 10/2013 | Casher et al. | |
| 8,556,638 B2 | 10/2013 | Tsubaki et al. | |
| 8,616,765 B2 * | 12/2013 | Darabnia | C23C 16/46 374/179 |
| 8,671,765 B2 | 3/2014 | Tokuda et al. | |
| 8,734,190 B2 | 5/2014 | Schlitzkus et al. | |
| 8,758,067 B2 | 6/2014 | Rathburn | |
| 8,764,464 B2 | 7/2014 | Buck et al. | |
| 8,887,580 B2 | 11/2014 | Nishikawa et al. | |
| 8,893,562 B2 | 11/2014 | Barraco et al. | |
| 8,919,656 B2 | 12/2014 | Eckerdt | |
| 2002/0029639 A1 | 3/2002 | Wagner et al. | |
| 2002/0071475 A1 | 6/2002 | Betzner et al. | |
| 2002/0189334 A1 | 12/2002 | Ford et al. | |
| 2003/0109163 A1 | 6/2003 | Shimada | |
| 2004/0020300 A1 | 2/2004 | Boehler et al. | |
| 2004/0114664 A1 * | 6/2004 | Park | G01K 1/12 374/179 |
| 2004/0182145 A1 | 9/2004 | Okazaki et al. | |
| 2005/0061063 A1 | 3/2005 | Haussner et al. | |
| 2005/0150301 A1 | 7/2005 | Skinner et al. | |
| 2005/0233614 A1 | 10/2005 | Gattuso et al. | |
| 2006/0053875 A1 | 3/2006 | Haussner et al. | |
| 2006/0090566 A1 | 5/2006 | Oda | |
| 2006/0214202 A1 | 9/2006 | Zorich et al. | |
| 2006/0218997 A1 | 10/2006 | Yamada et al. | |
| 2006/0278012 A1 | 12/2006 | Fujimoto et al. | |
| 2007/0071065 A1 | 3/2007 | Pils et al. | |
| 2007/0110124 A1 | 5/2007 | Shiraki et al. | |
| 2007/0113660 A1 | 5/2007 | Matsui | |
| 2007/0148788 A1 | 6/2007 | Hsieh et al. | |
| 2007/0193362 A1 | 8/2007 | Ferguson | |
| 2007/0203650 A1 | 8/2007 | Jensen et al. | |
| 2007/0237205 A1 | 10/2007 | Hayashi | |
| 2008/0031305 A1 * | 2/2008 | Kobayashi | G01K 1/083 374/208 |
| 2008/0036569 A1 * | 2/2008 | Houben | G01K 1/08 338/28 |
| 2008/0053237 A1 | 3/2008 | Matsui et al. | |
| 2008/0083283 A1 | 4/2008 | Takeuchi et al. | |
| 2008/0112462 A1 | 5/2008 | Sisk et al. | |
| 2008/0149079 A1 | 6/2008 | Jefford et al. | |
| 2008/0216786 A1 | 9/2008 | Ramond et al. | |
| 2008/0219319 A1 | 9/2008 | Buckalew | |
| 2009/0008092 A1 | 1/2009 | Haeberle et al. | |
| 2009/0080492 A1 | 3/2009 | Takeuchi | |
| 2009/0095059 A1 | 4/2009 | Matsui et al. | |
| 2009/0194831 A1 | 8/2009 | Casey et al. | |
| 2009/0320576 A1 | 12/2009 | Borgers et al. | |
| 2010/0002745 A1 | 1/2010 | Stoll et al. | |
| 2010/0091817 A1 * | 4/2010 | Wienand | G01K 1/12 374/185 |
| 2010/0147822 A1 | 6/2010 | Burrows et al. | |
| 2011/0019373 A1 | 1/2011 | Ryhanen et al. | |
| 2011/0019714 A1 | 1/2011 | Perry | |
| 2011/0032971 A1 | 2/2011 | Reiter | |

(56) References Cited

U.S. PATENT DOCUMENTS

| | | |
|---|---|---|
| 2011/0101844 A1 | 5/2011 | Glaser et al. |
| 2011/0201221 A1 | 8/2011 | Kobayashi |
| 2011/0238281 A1* | 9/2011 | Sparks ................... G01K 1/12 701/102 |
| 2011/0290539 A1 | 12/2011 | Willner et al. |
| 2012/0006119 A1 | 1/2012 | Broden et al. |
| 2013/0004116 A1 | 1/2013 | Ruggiero et al. |
| 2013/0201230 A1 | 8/2013 | Sugahara et al. |
| 2013/0223478 A1* | 8/2013 | Landis ................... G01K 1/08 374/144 |
| 2013/0264664 A1 | 10/2013 | Nimura et al. |
| 2013/0317388 A1 | 11/2013 | Bieberich et al. |
| 2014/0060015 A1 | 3/2014 | Yan et al. |
| 2014/0165735 A1 | 6/2014 | Kurtz et al. |
| 2014/0216173 A1 | 8/2014 | Chana |
| 2014/0260648 A1 | 9/2014 | Aoyama et al. |
| 2014/0324323 A1 | 10/2014 | Gates et al. |
| 2014/0341255 A1 | 11/2014 | Kaiser et al. |
| 2014/0345374 A1 | 11/2014 | Morselli et al. |
| 2015/0045971 A1 | 2/2015 | Endel et al. |
| 2015/0072543 A1 | 3/2015 | Willner et al. |
| 2015/0192478 A1 | 7/2015 | Rueth et al. |
| 2015/0204733 A1 | 7/2015 | Newell et al. |
| 2015/0323392 A1* | 11/2015 | Mori ....................... G01K 7/02 374/165 |
| 2016/0169749 A1* | 6/2016 | Glasheen ............... G01K 1/08 374/179 |
| 2016/0195415 A1 | 7/2016 | Lull |
| 2016/0356174 A1* | 12/2016 | Myers ................... F01D 17/085 |

FOREIGN PATENT DOCUMENTS

| | | |
|---|---|---|
| DE | 10361749 A1 | 7/2005 |
| DE | 102004048367 A1 | 4/2006 |
| DE | 102013206797 A1 | 10/2013 |
| EP | 350612 A2 | 1/1990 |
| EP | 893676 A2 | 1/1999 |
| EP | 1074827 A2 | 2/2001 |
| EP | 2075557 A2 | 7/2009 |
| EP | 2138819 A1 | 12/2009 |
| EP | 2410306 A2 | 1/2012 |
| FR | 2880685 A1 | 7/2006 |
| FR | 3035500 | 10/2016 |
| GB | 1461574 | 1/1977 |
| JP | 2001093634 A | 4/2001 |
| JP | 2002014113 A | 1/2002 |
| JP | 2002170617 A | 6/2002 |
| JP | 2003100375 A | 4/2003 |
| JP | 2010153321 A | 7/2010 |
| JP | 2010256187 A | 11/2010 |
| JP | 4854612 B2 | 1/2012 |
| WO | WO-9508758 A1 | 3/1995 |
| WO | WO-2004066194 A1 | 8/2004 |
| WO | WO-2005052535 A1 | 6/2005 |
| WO | WO-2006102460 A1 | 9/2006 |
| WO | 2009034698 A1 | 3/2009 |
| WO | WO-2011094753 A2 | 8/2011 |
| WO | WO-2014042264 A1 | 3/2014 |

\* cited by examiner

FLOATING CONDUCTOR HOUSING

TECHNICAL FIELD

The subject technology relates to temperature sensors and, more particularly to high-temperature sensors such as for an exhaust system of an automobile.

BACKGROUND

Emission regulations are an important source for driving innovation in the development of cleaner running engines. The automotive industry has made many advances in engine design, engine controls, fuel injection and the like in order to improve emissions. The exhaust system has been of particular importance in meeting and exceeding regulations. In order to insure proper function of the exhaust system and engine overall, various sensors provide information to the engine controls. Typical sensors include temperature sensors, pressure sensors and oxygen sensors.

The exhaust system is a particularly difficult environment in which to deploy sensors. In both diesel and gasoline applications, internal combustion engine design is focused on increasing power density, fuel efficiency, and engine agility. These developments are driving the exhaust systems to higher temperatures and higher gas speeds together with sharper temperature changes. Typical operating temperatures range from the very cold ambient temperature at start up to 750-1200° C. during operation. The thermal shocks may be as much as 1100 $Ks^{-1}$ and induce a significant amount of mechanical stress. Further, the exhaust system often has caustic gases that can be quite corrosive. Along with these rapid temperature changes and chemically hostile environment, significant vibration is not unusual. As a result, sensor life is often limited and failure can occur. In contrast, other components of the exhaust system of an internal combustion (IC) engine have a long lifetime.

Typically, high temperature sensors consist of a tip assembly which is exposed to the medium to be measured. With exhaust gas temperature sensors, the tip assembly may be in contact with the exhaust gas. A temperature sensing element is housed within the tip assembly so that heat-flux is transferred into the tip assembly. The internal temperature sensing element could be a positive temperature coefficient (PTC) thermistor or negative temperature coefficient (NTC) thermistor.

Several examples of exhaust gas sensor technology are U.S. Pat. No. 6,639,505 B2 issued Oct. 28, 2003 to Murata et al., U.S. Pat. No. 6,829,820 B2 issued Dec. 14, 2004 to Adachi et al., U.S. Pat. No. 8,328,419 B2 issued Dec. 11, 2012 to Wienand et al., U.S. Pat. No. 5,831,512 issued on Nov. 3, 1998 to Wienand et al., U.S. Pat. No. 8,333,506 issued on Dec. 18, 2012 to Kamenov et al., U.S. Pat. No. 6,617,956 issued on Sep. 9, 2003 to Zitzmann, and U.S. Pat. No. 6,353,381 issued on Mar. 5, 2002 to Dietmann et al., each of which is incorporated herein by reference.

A common positioning of the exhaust gas temperature (EGT) sensor in the outlet of an exhaust system creates high positive and negative temperature gradients on the tip as illustrated in FIG. 1. The gradients create a delta on the tip assembly 900 between the outer portion of the metal tube 902 and the inner portion the metal tube 902. The sensing element 904 is typically near a distal end of the metal tube 902 and embedded in a cement paste. Leads 906 carry the signal from the sensing element 904. The electrical leads 906 are mechanically coupled. A standard approach is to have mineral insulated cable with the leads in a fixed position.

The temperature delta creates positive and negative thermal shocks. Negative thermal shocks, illustrated by arrow 908, create pushing on the sensing element 904 as shown by arrow 910. Positive thermal shocks, illustrated by arrow 912, create pulling on the sensing element 904 as shown by arrow 914. The result is harsh compressive and tensile stresses between the internal components, connections and electrical leads 906. The stresses lead to damage and failure.

SUMMARY

In view of the above, it would be beneficial to prevent, reduce or minimize mechanical stress caused by temperature gradients, vibration and other sources. It would be particularly beneficial to address mechanical deformation at the weaker points such as the electrical leads and the connections of the electrical leads to various components. Decoupling releases the stresses imposed by the temperature gradients.

It is an object of the present technology to provide an improved temperature sensor which is at least one of: reliable; cheaper to manufacture; producible in high volume by means of semi- or full automatic production processes; long lasting; and withstanding of the high temperature and vibration typical of an internal combustion engine.

In one embodiment, the subject technology provides a decoupling mechanism to allow an exhaust gas temperature sensor to survive extreme temperature gradients and/or automobile vibration. One version of the decoupling mechanism creates force-decoupling of the measuring tip and sensor body by using floating connecting conductors.

In one embodiment, the subject technology reduces the stress in the wires and wire connections due to the very high heating and cooling gradients which leads to excessive compressive and tensile stresses between several materials of the internal components and connection leads between the supply lines and the temperature sensing element. The stress is reduced by mechanically decoupling or floating of the leads and/or supply lines.

In an embodiment, the subject technology is directed to a sensor assembly 100, 200, 300 comprising a sensing element 106, 206, 306 with at least one electrical lead 105, 205, 305 extending therefrom. A tube 104, 204, 304 encloses the sensing element and material 114, 214, 314 surrounds the at least one electrical lead and defines a space 116, 216, 316 around the at least one electrical lead so that when temperature gradients create push and pull, the at least one electrical lead moves within the space. The sensor assembly may further comprise a sleeve 120, 220, 320 connected to the tube and surrounding the material, at least one lead extension 108, 218, 318 connected to the at least one electrical lead, and distal material 110, 210, 310 fixing the sensing element in a distal end 109, 209, 309 of the tube. The distal material and the material can define a gap 112, 212, 312 therebetween. Preferably, the sensing element is a temperature sensing element; the material is insulation material, the distal material is insulation material, and a connection point 107 between the at least one lead extension and the at least one electrical lead is supported by the material.

The sensor assembly may further comprise a sleeve 220 connected to the tube and surrounding the material, wherein the sleeve has an intermediate bent portion 228 that the at least one electrical lead passes through. The at least one electrical lead can be two or more leads. A braided supply line 218 may connect to the leads, the braided supply line being arranged and configured within the bent portion to absorb movement of the two leads from temperature gradients. Preferably, distal material fixes the sensing element in a distal end 209 of the tube so that an air gap 212 is formed between the material and the distal material. Proximal material 232 may fix the braided supply line in a proximal end 232 of the sleeve. A covering can protect, support and electrically insulate the braided supply line. Preferably, the bent portion has a bending angle $\alpha$ between 15-110°. A connector may mount on the sleeve for coupling the sensor assembly to an exhaust system.

In another embodiment, a sleeve 120, 220, 320 connects to the tube and surrounds the material, wherein the at least one electrical lead 305 extends through the sleeve forming a sinusoidal shape within the sleeve for absorbing movement resulting from temperature gradients. Preferably, the sinusoidal shape includes two arcuate sections 309. An inner layer 336 on the sleeve can provide electrical insulation and mechanical dampening for the at least one lead.

It should be appreciated that the subject technology can be implemented and utilized in numerous ways, including without limitation as a process, an apparatus, a system, a device, and a method for applications now known and later developed. Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings.

DESCRIPTION OF EMBODIMENTS

Figure 1:
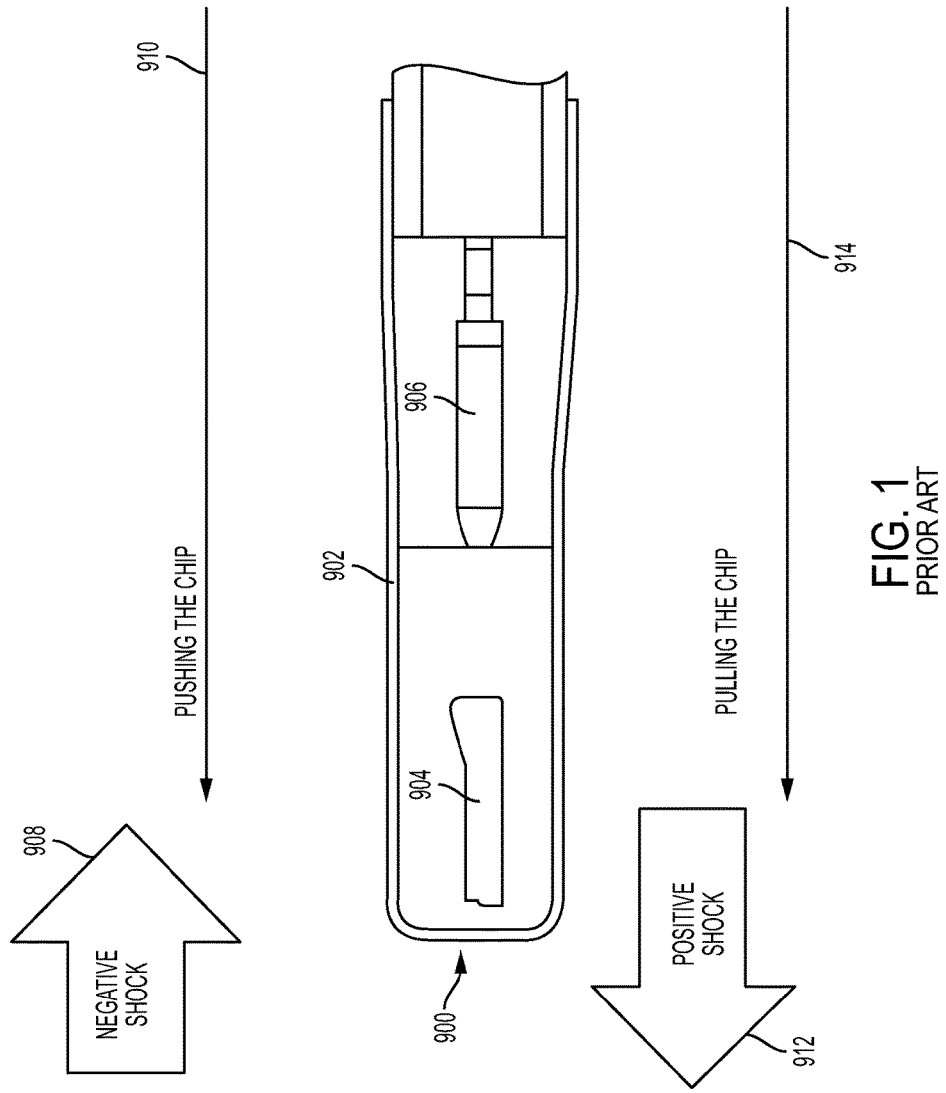
FIG. 1 is a schematic view of a prior art tip assembly to illustrate positive and negative temperature shock.

The subject technology overcomes many of the prior art problems associated with high-temperature sensors and, particularly improves the robustness of the sensor. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements.

Figure 2:
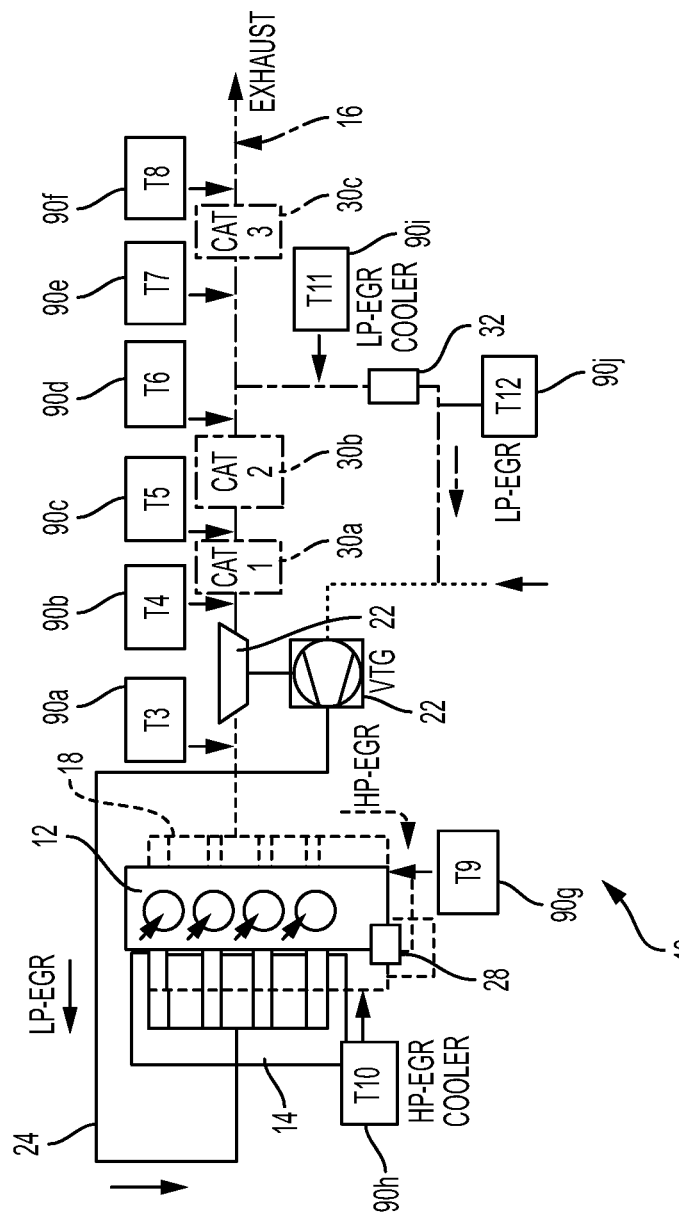
FIG. 2 is a schematic view of an engine system in accordance with the subject technology.

Referring to FIG. 2, a schematic view of an exemplary engine system 10 is shown. The engine system 10 recirculates a portion of the gases coming out of the engine 12 by putting the exhaust emissions back into the intake manifold 14, where the engine 12 can burn the emissions again, thereby reducing the emissions. The exhaust system 16 has many components including piping and fittings shown in a simplified manner. The exhaust system 16 collects hot engine emissions from the exhaust manifold 18 for subsequent processing. The exhaust system 16 selectively routes the emissions to a variable turbine geometry (VTG) 22. The VTG 22 has air intake to feed a low pressure EGR section 24. There is also a high pressure EGR cooler 28 in a high pressure EGR section 26 that feeds the intake manifold 14. The EGR cooler 28 uses engine coolant to reduce exhaust gas temperatures prior to recirculating them through the engine's intake manifold 14. Reducing engine combustion temperature helps prevent the formation of Oxides of Nitrogen (NOx) pollutants.

However, much of the emissions still exits the exhaust system 16. Before egress, the emissions pass through three catalytic converters 30a-c. The catalytic converters 30a-c may be any type and number such as an oxidation catalytic converter (DOC), particulate oxide purification (POC), diesel particulate filter (DPF), NOC, NSC, SCRF, SCR, NST, DOC-DPF, NH3 and the like for oxidizing the exhaust gas and removing exhaust soot particles to reduce harmful gas emissions. Preferably, there is also a second low pressure EGR cooler 32 for additionally feeding air to the VTG 22.

Importantly, the engine control system (not shown) interacts with these components and monitors various parameters using a plurality of sensors. The following description relates to temperature sensors but it is understood that the subject technology is applicable to any type of sensor including, without limitation, pressure sensors, combination temperature and pressure sensors, and oxygen sensors. The exhaust system 16 has a plurality of temperature sensors 90a-j, which may or may not be interchangeable. Additionally, the engine system 10 may be an existing engine system that has temperature sensors in accordance with the subject technology retrofit therein. Sensors in accordance with the subject technology are applicable to any engine system could be a diesel, gasoline, or other fuel type engine and is not limited to any particular type of engine or other sensing application.

Figure 3:
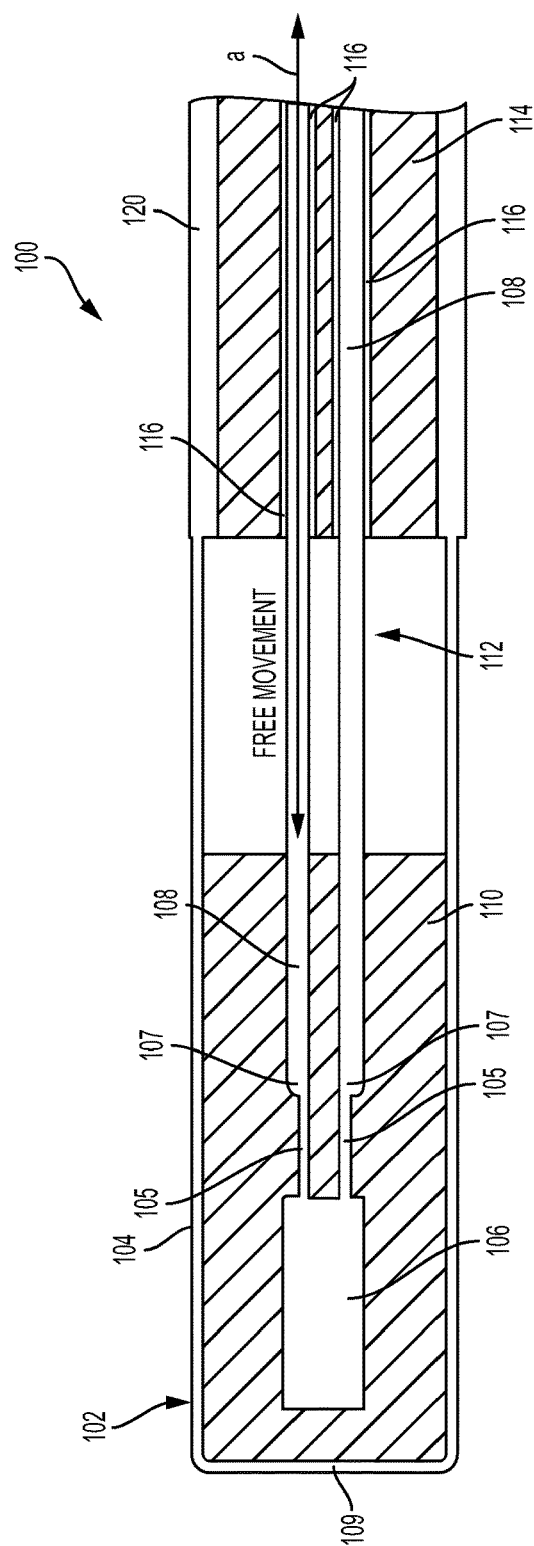
FIG. 3 is a partial cross-sectional view of a sensor assembly in accordance with the subject technology.

Referring now to FIG. 3, a partial cross-sectional view of a tip assembly 102 of a sensor assembly 100 is shown. The tip assembly 102 includes a tube 104 with a distal end 109 that encloses a sensing element 106. Preferably, the tube 104 is fabricated from metal. The sensing element 130 may be any type of sensing element.

The sensing element 106 has sensor leads 105 extending therefrom. The sensor leads 105 couple to wires or extended leads 108 for additional length. In an alternative embodiment, the sensor leads 105 may extend all the way to an electrical connector (not shown) or a different length. The sensor leads 105 and extended leads 108 are connected together, such as by soldering, at a connection point 107. In the distal area of the tube 104, material 110 surrounds the sensing element 106 for providing support and protection. The material 110 is preferably an insulation material and also encloses the connection point between the sensing element 106 and the leads 108.

The tube 104 has an insulation gap 112, before additional insulation material 114 surrounds the leads 134. A protective sleeve 120 surrounds the insulation material 114. The proximal insulation material 114 creates a space 116 around the leads 108. In one embodiment, the space 116 is radial and tangential to the rear. The space 116 allows free movement of the leads 108 as shown by axial arrow "a" in both directions. As a result, when the temperature gradients create push and pull, the leads 108 can move, which decreases stress, reduces fatigue, and reduces failure.

Figure 4:
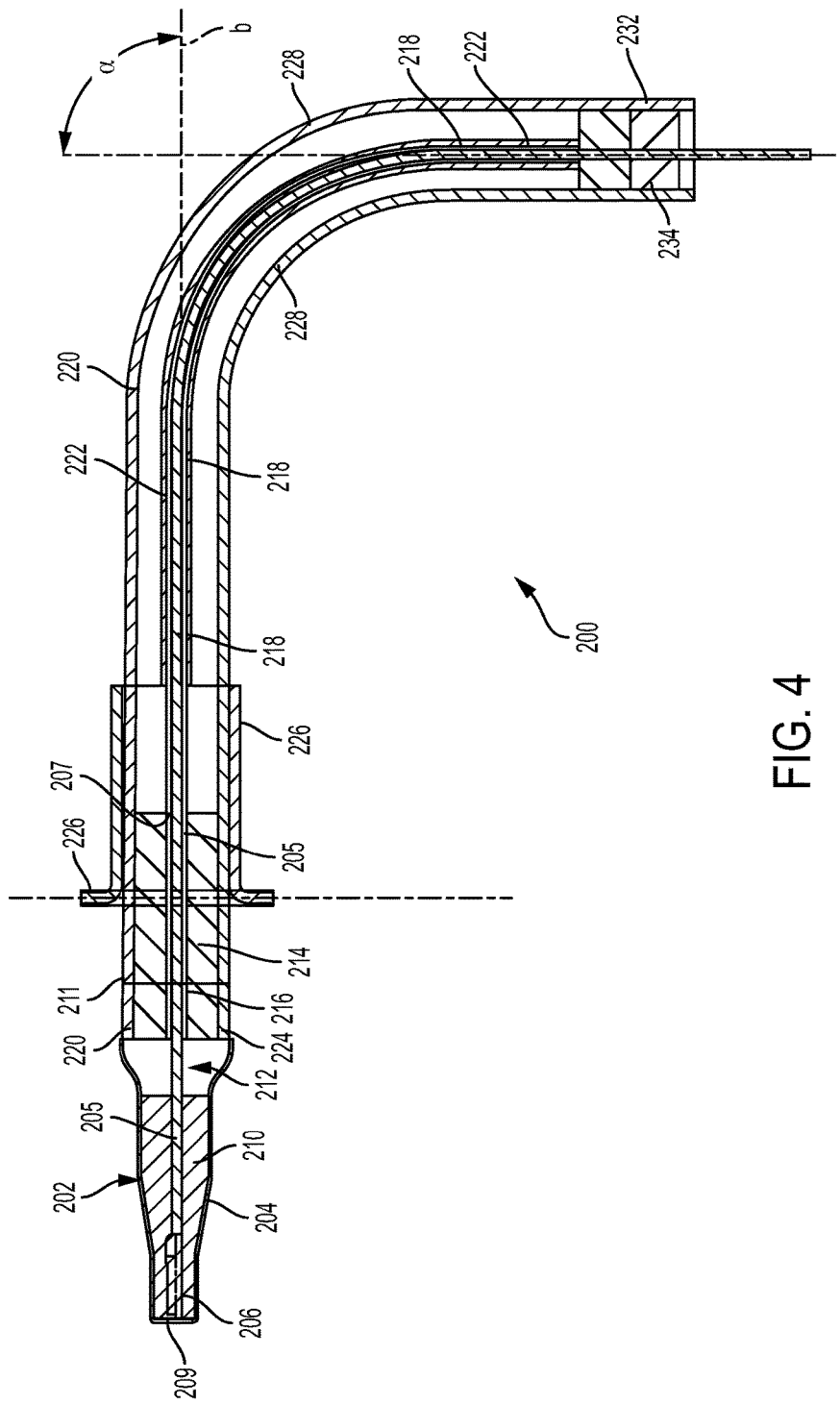
FIG. 4 is a cross-sectional view of another sensor assembly in accordance with the subject technology.

Referring now to FIG. 4, a cross-sectional view of another sensor assembly 200 in accordance with the subject technology is shown. The sensor assembly 200 is similar to the sensor assembly 100 described above so that like reference numbers are used. The sensor assembly 200 includes a tip assembly 202 with a distal tube 204. The tube 204 has a closed distal end 209 and an open proximal end 211. When mounted in an engine, the tube 204 is exposed to the medium to be measured.

The tube 204 encloses a temperature sensing element 206. The temperature sensing element 206 could be a PTC or NTC device. Leads 205 extend from the temperature sensing element 206 and electrically and mechanically couple to a braided supply line 218 by means of a wire connection. The leads 205 and supply line 218 could be coupled by soldering. In one embodiment, the leads 205 are plated wires with a diameter in the range of 0.2-0.3 mm.

In another embodiment, a conductive tube-shaped structure is used on each lead 205 to couple the leads 205 to the supply line 218. The supply line 218 may be braided as well as a mineral-insulated supply line. A mineral insulated supply strand, for example, comprises strands made of alloy 601 (60% wt. % Nickel, 21 wt. % Chromium, 15 wt. % Iron, and 1.2 wt. % Aluminium) or other Nickel alloys.

The leads 205 and/or the supply line 218, as the case may be, extend through a protective sleeve 220. The tube 204 and the sleeve 220 may be fabricated from metal such as an alloy of 60% wt. % Nickel, 21 wt. % Chromium, 15 wt. % Ferro, and 1.2 wt. % Aluminium or other Stainless Steel alloys.

At a distal end 224 of the sleeve 220, the leads 205 and/or the supply lines 218 are again surrounded by insulation material 214, which forms a space 216 around the leads 205 and/or the supply line 218 depending upon the configuration and arrangement of the insulation material 214. As a result, the leads 205 and/or the supply lines 218 again have free movement. The connection of the leads 205 to the supply lines 218 occurs at a connection point 207 approximately where the insulation material 214 stops. As the supply lines 218 extend from the insulation material 214, the supply lines 218 have a protective braid covering 222 that is also electrically insulating. In alternative embodiments, the connection point 207 is before, in, or well after the insulation material 214.

The open proximal end 211 of the tube 204 is connected to the sleeve 220 such as by crimping, welding and/or other techniques. A connector 226 mounts over the sleeve 220 as well for coupling the sensor assembly 200 to the exhaust system. The connector 226 may have outer threads and the like for attachment. With reference to FIG. 4, a vertical dashed line extends from the connector to generally illustrate where the environment would transition from hot (e.g., the left side of FIG. 4) to cold (e.g., the right side). It is beneficial to have the strain relief, such as a spring portion, on the cold side because the excessive heat on the hot side softens and changes the performance characteristics of the spring portion. The spring portion may be a traditional helical configuration, a bent round wire, a bent flat wire, a wavy shaped portion and the like. Temperatures on the hot side may exceed 500° C.

The sleeve 220 has an intermediate bent portion 228. At a proximal end 232 of the sleeve 220, the leads 205 or supply line 218 (as the case may be) are again fixed in an insulating material 234 for support. However, between the support of material 214 and material 234, the supply line 218 is unsupported but remains somewhat centered within the sleeve 220. The braiding and braid covering 222 inherently provide structural support to the electrical supply line 218.

As shown, a bending angle α of the bent portion 228 is approximately 90°. In a preferred embodiment, the angle α is between 15-110°. By creating a local bending angle α in the sleeve 220, a floating mechanism of connection wires is created. The bending angle α allows movement that does not have to overcome the stiffness of the leads 205 and/or the supply line 218. Displacement and the associated stress caused by positive and negative gradients is alleviated because the leads 205 and supply lines 218 are able to move along a tip assembly axis "b" and flex the bent portion of the supply lines 218. Preferably, the braiding on the supply lines 218 has a stiffness and shape to provide guidance for the movement of the leads 205 and supply lines 218 while maintaining electrical insulation. In one embodiment, the leads coming off the sensing element are relatively stiff compared to the supply line. Thus, the supply line can easily flex to accommodate movement.

Figure 5:
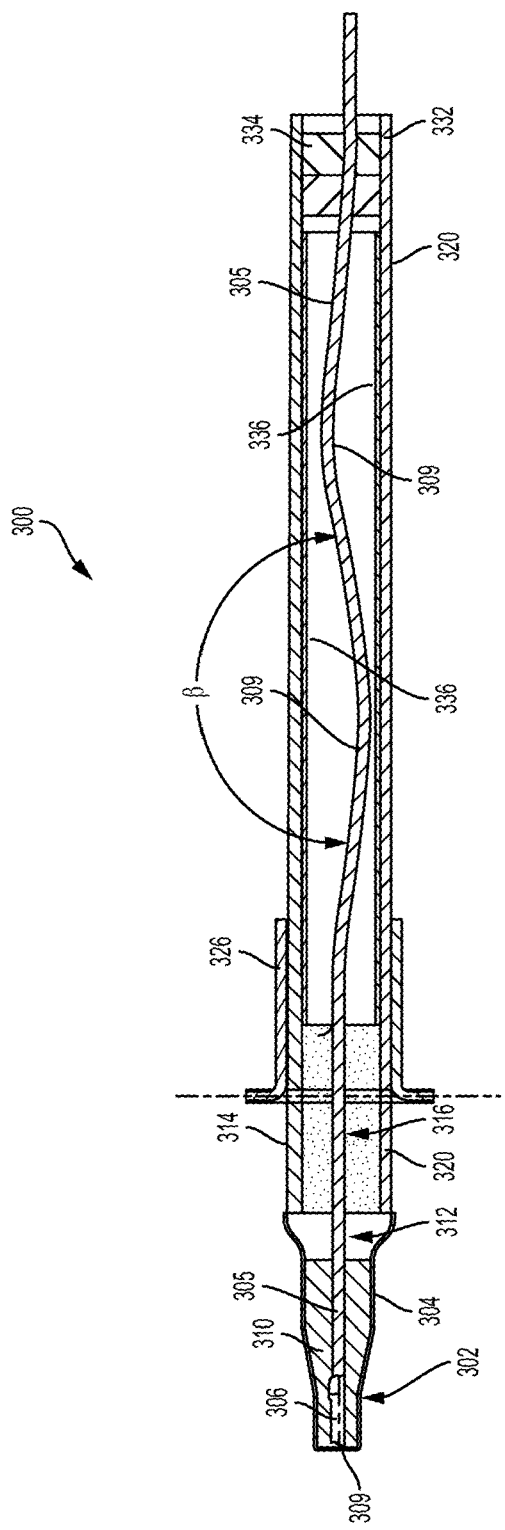
FIG. 5 is a cross-sectional view of still another sensor assembly in accordance with the subject technology.

Referring now to FIG. 5, a further embodiment of a sensor assembly 300 in accordance with the subject technology is shown. Similar elements to those described in connection with above-described embodiments are indicated with the like reference numbers. Many elements are essentially the same as those of the foregoing embodiments and, thus, are not further described herein. A difference between the sensor assembly 300 and the sensor assembly 200 is that the sleeve 318 is straight.

The sensor assembly 300 has relatively longer leads 305 extending from the sensing element 306. The leads 305 pass through an air gap or space 316 in the insulation material 314. Due to the extended length, the leads 305 can extend all the way through the straight sleeve 320 and through the proximal fixation point in the other insulation material 334. However, the leads 305 are not straight but rather formed in a sinusoidal shape. As shown, the leads 305 have two arcuate sections 309 but any number of bends is possible. The sinusoidal shape of the leads 305 allows flexing during movement from temperature gradients. The arcuate sections 309 have a bending angle R. The inside of the sleeve 320 has an inner layer 336. The inner layer 336 provides electrical insulation and mechanical dampening for the leads 305. The inner layer 336 may include multiple layers.

When displacement is caused by positive and negative gradients, the leads 305 are able to absorb the movement with a lower force than a breaking point. The leads 305 can move in both directions. The planned movement of the compression of the sinusoidal shape avoids the brittleness and lack of ductility of the traditional cement and connection points that can cause failure of standard mineral cable with fixed leads. It is envisioned that the bent sleeve and bent leads could be used in the same sensor assembly. The combination would allow the desirable internal movement to reduce and alleviate the stress induced by temperature gradients. Preferably, the movement can accommodate 0.2 mm or more. The strength of the arcuate sections 309 is determined by a plurality of factors including, without limitation, the amplitude, the radius and the thickness of the sections. Selection of the parameters for low resistance force to the push/pull movement results in robust, durable and reliable operation of the strain relief mechanism.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., tubes, strands, sleeves, coatings and the like) shown as distinct for purposes of illustration may be incorporated within other functional elements in a particular implementation. Further, the materials and components can be composed of several materials and take many desirable shapes. It is envisioned that the subject technology is particularly applicable to an exhaust gas temperature sensor (EGTS) and other fields and applications. The reduced stress very effectively increases the lifetime of an EGTS. The disclosed embodiments have all a cylindrical shape. It is envisioned that any other shape might be used such as oval or polygonal.

All patents, patent applications and other references disclosed herein are hereby expressly incorporated in their entireties by reference. While the subject technology has been described in terms of several embodiments, it is contemplated that alternatives, modifications, permutations and equivalents thereof will become apparent to those skilled in the art upon reading the specification and upon study of the drawings. The invention is not limited to the illustrated embodiments, but it is intended to cover modifications within the spirit and scope of the present invention as defined by the appended claims.

What is claimed is:

1. A sensor assembly comprising:
a sensing element with at least one electrical lead extending therefrom;
a tube surrounding the sensing element;
an insulating material surrounding a portion of the at least one electrical lead and defining a space around the at least one electrical lead so that when temperature gradients create push and pull, the at least one electrical lead moves within the space;
a sleeve connected to the tube and surrounding the insulating material;
at least one lead extension connected to the at least one electrical lead at a connection point; and
a distal material fixing the sensing element in a distal end of the tube, wherein the distal material and the insulating material define an air gap therebetween, and wherein the at least one electrical lead is continuously extended from the sensing element to the connection point located within the insulating material.

2. A sensor assembly as recited in claim 1, wherein: the sensing element is a temperature sensing element; the distal material is insulation material; a connection point between the at least one lead extension and the at least one electrical lead is supported by the material; and the sleeve has an intermediate bent portion that the at least one electrical lead passes through.

3. A sensor assembly as recited in claim 2, wherein the bent portion has a bending angle $\alpha$ between 15-110°.

4. A sensor assembly as recited in claim 1,
wherein the at least one electrical lead is two leads, and
further comprising: a braided supply line connected to the two leads, the braided supply line being arranged and configured within the intermediate bent portion to absorb movement of the two leads from temperature gradients; proximal material fixing the braided supply line in a proximal end of the sleeve; and a covering for protecting, supporting and electrically insulating the braided supply line.

5. A sensor assembly as recited in claim 1, further comprising a connector mounted on the sleeve for coupling the sensor assembly to an exhaust system.

6. A sensor assembly as recited in claim 1, wherein the at least one electrical lead includes a spring portion biasing the at least one electrical lead.

7. A sensor assembly as recited in claim 6, wherein a first portion of the tube surrounding the material is exposed to exhaust gas and a second portion of the tube is exposed to ambient conditions, the spring portion being within the second portion.

8. A sensor assembly as recited in claim 7, wherein the material extends within the first and second portions of the tube.

9. A sensor assembly as recited in claim 1, further comprising:
a sleeve connected to the tube and surrounding the material, wherein the at least one electrical lead extends through the sleeve forming a sinusoidal shape within the sleeve for absorbing movement resulting from temperature gradients.

10. A sensor assembly as recited in claim 9, wherein the sinusoidal shape includes two arcuate sections.

11. A sensor assembly as recited in claim 9, further comprising an inner layer on the sleeve for providing electrical insulation and mechanical dampening for the at least one lead.

12. A sensor assembly comprising:
a sensing element with an electrical lead extending therefrom, the electrical lead includes a spring portion biasing the electrical lead;
a tube surrounding the sensing element; and
an insulating material surrounding a portion of the at least one electrical lead and defining a space around the at least one electrical lead so that when temperature gradients create push and pull, the at least one electrical lead moves within the space and the spring portion provides strain relief;
a sleeve connected to the tube and surrounding the insulating material;
at least one lead extension connected to the electrical lead at a connection point; and
a distal material fixing the sensing element in a distal end of the tube, wherein the distal material and the insulating material define an air gap therebetween, and wherein the electrical lead is continuously extended from the sensing element to the connection point located within the insulating material.

13. A sensor assembly as recited in claim 12, wherein the sensor assembly is in an environment that transitions from hot to cold so that the sensor assembly includes a hot side and a cold side with the spring portion located in the cold side because of excessive heat on the hot side.

14. A sensor assembly as recited in claim 12, wherein temperatures on the hot side exceed 500° C. and the spring portion is selected from the group consisting: of a helical configuration; a bent round wire; a bent flat wire; and a wavy shaped portion.

15. A sensor assembly as recited in claim 12, wherein: a portion of the electrical lead is formed in a sinusoidal shape with at least two arcuate sections for allowing flexing of the electrical lead during movement from temperature gradients.

16. A sensor assembly as recited in claim 15, wherein the sinusoidal shaped portion is in an air gap and further comprising an inner layer within the tube that provides electrical insulation and mechanical dampening for the electrical lead in the air gap.

17. A sensor assembly comprising:
a sensing element with an electrical lead extending therefrom, the electrical lead includes a spring portion biasing the electrical lead;
a tube surrounding the sensing element;
an insulating material surrounding the sensing element and the at least one electrical lead and defining a space around the at least one electrical lead so that when temperature gradients create push and pull, the at least one electrical lead moves within the space and the spring portion provides strain relief, wherein a portion of the electrical lead is formed in a sinusoidal shape with at least two arcuate sections for allowing flexing of the electrical lead during movement from temperature gradients, the sinusoidal shaped portion is in an air gap; and an inner layer within the tube that provides electrical insulation and mechanical dampening for the electrical lead in the air gap;

a sleeve connected to the tube and surrounding the insulating material;

at least one lead extension connected to the electrical lead at a connection point; and a distal material fixing the sensing element in a distal end of the tube, wherein the distal material and the insulating material define an air gap therebetween, and wherein the electrical lead is continuously extended from the sensing element to the connection point located within the insulating material.

\* \* \* \* \*